United States Patent Office 3,059,014
Patented Oct. 16, 1962

3,059,014
PROCESS FOR PREPARING ORGANIC COMPOUNDS OF PHOSPHORUS AND SULFUR
Lee A. Miller and Gail H. Birum, Dayton, Ohio, assignors to Monsanto Chemical Company, St. Louis, Mo., a corporation of Delaware
No Drawing. Filed June 6, 1958, Ser. No. 740,182
5 Claims. (Cl. 260—461)

The present invention relates to organic compounds and more particularly provides new and valuable derivatives of alkenoic acids which contain both sulfur and phosphorus, the method of preparing the same, insecticidal compositions comprising said derivatives as the essential insecticidal ingredients and methods of destroying insect pests in which said compositions are employed.

The presently provided acrylic acid derivatives have the formula

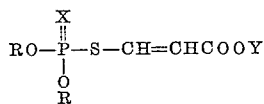

in which R and Y are alkyl radicals of from 1 to 8 carbon atoms, and X is selected from the class consisting of —O— and —S—.

Compounds of the above formula are readily obtainable by the reaction of an O,O-dialkyl phosphorodithioic acid or of an O,O-dialkyl phosphorothioic acid or an alkali metal or ammonium salt thereof with an alkyl propiolate. O,O-dialkyl phosphorodithioic acids and the presently useful salts include, e.g., O,O-dimethyl phosphorodithioic acid and the ammonium, sodium, potassium, or lithium salts thereof; O,O-diethyl phosphorodithioic acid or ammonium or sodium, O,O-diethyl phosphorodithioate; O, O-diisopropyl phosphorodithioic acid or ammonium O,O-diisopropyl phosphorodithioate; O,O-di-n-butyl phosphorothioic acid; sodium O,O-di-tert-butyl phosphorodithioate; O,O-diisoamyl phosphorodithioic acid; sodium O,O-di-n-amyl phosphorodithioate; O,O-di-n-hexyl phosphorothioic acid; potassium O,O-di-n-heptyl phosphorodithioate; O,O-di-n-octyl phosphorothioic acid; ammonium O,O-bis(2-ethylhexyl) phosphorothioate, etc.

Reaction of the phosphorothioic or phosphorodithioic acids or the salts thereof with the alkyl propiolate takes place readily by simply heating the two reactants at a temperature of from, say, 50° C. to 150° C. in the presence or absence of an inert diluent. While the reaction is advantageously effected in the presence of a basic material as catalyst, the use of a catalyst is not required. When the thioic or dithioic acid (rather than the S-salts thereof) is used, reaction proceeds by addition of the —SH group of the phosphorus acid across the triple bond of the acetylenic acid with production of the substituted acrylate; thus:

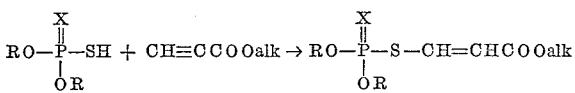

wherein R and alk denote an alkyl radical of from 1 to 8 carbon atoms and X is selected from the class consisting of oxygen and sulfur. When, instead of the O,O-dialkyl phosphorothioic or phosphorodithioic acid, there is employed an ammonium or alkali salt thereof, reaction proceeds through formation of an intermediately formed alkali metal or ammonium addition product. The ammonium compound is decomposed in situ during the reaction with evolution of gaseous ammonia; the alkali metal compound, when formed, is readily hydrolyzed in the presence of ionizable material, whereby the reaction product is that which is obtained from the free O,O-dialkyl phosphorothioic or dithioic acid.

One class of compounds having the above formula consists of alkyl 3-(dialkoxyphosphinothioylthio)acrylates wherein each alkyl and each alkoxy radical has from 1 to 8 carbon atoms. This class of compounds is prepared according to the invention by the addition reaction of an appropriate O,O-dialkyl phosphorodithioic acid (or an alkali metal or ammonium salt thereof) with an appropriate alkyl propiolate according to the scheme:

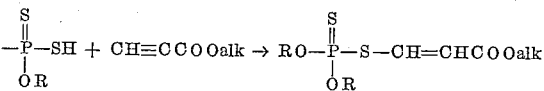

wherein R and alk denote an alkyl radical of from 1 to 8 carbon atoms.

Examples of products obtained by reaction of an O,O-dialkyl phosphorodithioate with an alkyl propiolate according to the invention are as follows:

Ethyl 3-(dimethoxyphosphinothioylthio)acrylate from O,O-dimethyl phosphorodithioate and ethyl propiolate; n-propyl 3-(dimethoxyphosphinothioylthio)acrylate from n-propyl propiolate and O,O-dimethyl phosphorodithioate; isoamyl 3-(diethoxyphosphinothioylthio)acrylate from isoamyl propiolate and O,O-diethyl phosphorodithioate; ethyl 3-(dimethoxyphosphinothioylthio)acrylate from ethyl propiolate and O,O-dimethyl phosphorodithioate; ethyl 3-(diethoxyphosphinothioylthio)acrylate from ethyl propiolate and O,O-diethyl phosphorodithioate; tert-butyl 3-(diethoxyphosphinothioylthio)acrylate from tert-butyl propiolate and O,O-diethyl phosphorodithioate; n-amyl 3-(diethoxyphosphinothioylthio)acrylate from n-amyl propiolate and O,O-diethyl phosphorodithioate; isohexyl 3-(diethoxyphosphinothioylthio)acrylate from isohexyl propiolate and O,O-diethyl phosphorodithioate; n-heptyl 3-(diethoxyphosphinothioylthio)acrylate from n-heptyl propiolate and O,O-diethyl phosphorodithioate; 2-ethylhexyl 3-(diethoxyphosphinothioylthio)acrylate from 2-ethylhexyl propiolate and O,O-diethylphosphorodithioate; n-octyl 3-(diethoxyphosphinothioylthio)acrylate from n-octyl propiolate and O,O-diethyl phosphorodithioate; methyl 3-(diisopropoxyphosphinothioylthio)acrylate from methyl propiolate and O,O-diisopropyl phosphorodithioate; methyl 3-(dibutoxyphosphinothioylthio)acrylate from methyl propiolate and O,O-dibutyl phosphorodithioate; methyl 3-(di-tert-amyloxyphosphinothioylthio)-acrylate from methyl propiolate and O,O-di-tert-amyl phosphorodithioate; methyl 3-[bis(2-ethylhexyloxy)phosphinothioylthio]acrylate from methyl propiolate and bis(2-ethylhexyl)phosphorodithioate; 2-ethylhexyl 3-[bis(2-ethylhexyloxy)phosphinothioylthio]acrylate from 2-ethylhexyl propiolate and bis(2-ethylhexyl) phosphorodithioate; methyl 3-(ethoxymethoxyphosphinothioylthio)acrylate from methyl propiolate and O-ethyl O-methyl phosphorodithioate; butyl 3-(amyloxyisopropoxyphosphinothioylthio)acrylate from butyl propiolate and O-amyl O-isopropyl phosphorodithioate, etc.

Another class of the presently provided compounds consists of alkyl 3-(dialkoxyphosphinylthio)acrylates wherein each alkyl radical and each alkoxy radical has from 1 to 8 carbon atoms. These compounds have the formula

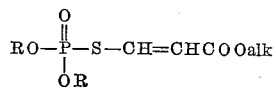

wherein R and alk denote an alkyl radical of from 1 to 8 carbon atoms.

The alkyl 3-(dialkoxyphosphinylthio)acrylates are obtained by heating an appropriate alkyl propiolate with an O,O-dialkyl phosphorothioic acid, rather than with the O,O-dialkyl phosphorodithioic acid used for preparation of the alkyl 3-(dialkoxyphosphinothioylthio)acrylates. Because the ammonium or alkali metal O,O-dialkyl phosphorothioates are more readily available than the O,O-dialkyl phosphorothioic acids, preparation of the alkyl 3-(dialkoxyphosphinylthio)acrylates is effected advantageously from said salts. Owing to the ease with which the intermediately formed ammonium compound is decomposed during the reaction, the ammonium O,O-dialkyl phosphorothioates are preferred reactants. Thus, ammonium salts such as ammonium O,O-dimethyl, diethyl, di-n-butyl, di-n-hexyl, or bis(2-ethylhexyl) phosphorothioate and an alkyl propiolate such as methyl propiolate readily yields, e.g., methyl 3-(dimethoxyphosphinylthio)-acrylate, methyl 3 - (diethoxyphosphinylthio)acrylate, methyl 3-(di-n-butoxyphosphinylthio)-acrylate, methyl 3-(di-n-hexyloxyphosphinylthio)acrylate or methyl 3-[bis(2-ethylhexyloxy)phosphinylthio]acrylate. Similarly, use of ethyl or n-propyl or n-octyl propiolate instead of the methyl propiolate gives the ethyl or n-propyl or n-octyl esters of the 3-(dialkoxyphosphinylthio)acrylic acids, e.g., n-propyl 3-(diethoxyphosphinylthio)acrylate is obtained from n-propyl propiolate and ammonium O,O-diethyl phosphorothioate.

Reaction of the alkyl propiolates with the phosphorothioates or dithioates to give the present acrylic acid derivatives advantageously is effected in the presence of an inert diluent and a basic agent as catalyst. As diluents there may be employed, e.g., benzene, xylene, nitrobenzene, dioxane, hexane, etc. Useful basic agents as catalysts are organic or inorganic basically reacting compounds such as the alkali metal hydroxides or basic salts thereof, e.g., sodium hydroxide or potassium carbonate; basic salts of organic acidic materials such as sodium acetate or sodium methoxide, organic bases such as the heterocyclic nitrogen compounds, e.g., pyridine, the quaternary amines, e.g., benzyltrimethylammonium hydroxide and the methoxide thereof, etc. The basic agent is employed in only catalytic quantities, say, in a quantity of from 0.001% to 1.0% based on the weight of the propiolate compound. Generally, the quantity of catalyst which is used is so small that no precautions need be taken to separate it from the product. However, when non-distillable strong, basic agents are employed in the greater amounts, say, in a quantity of about 1.0%, washing with dilute aqueous acidic materials, e.g., ammonium chloride is recommended. The washing procedure is also recommended when the phosphorus-containing reactant is an alkali metal salt.

Since formation of the present esters involves addition of one mole of the phosphorothioate or phosphorodithioate to one mole of the propiolate, these reactants are advantageously employed in such stoichiometric proportions. However, since an excess of either the phosphorus ester or the propiolate is easily separated from the reaction product, the reactants need not be employed in the stoichiometric proportions.

The presently provided esters are stable, well-characterized compounds which, depending on the length of the alkyl or alkoxy radicals, range from viscous liquids to waxy or crystalline solids. They are advantageously used for a variety of industrial and agricultural purposes, e.g., as plasticizers for synthetic resins and plastics and as lubricant additives, but they are particularly valuable as the effective ingredient of insecticidal compositions. The present compounds are highly useful agricultural chemicals in that they possess no phytotoxic effect at concentrations at which they exert contact and systemic insecticidal effect.

The invention is further illustrated, but not limited, by the following examples:

*Example 1*

A mixture consisting of 12.6 g. (0.15 mole) of methyl propiolate, 50 ml. of benzene and 0.5 ml. of 40% methanolic benzyltrimethylammonium methoxide was added, dropwise, to a mixture consisting of 16.6 g. (0.089 mole) of O,O-diethyl phosphorodithioic acid and 50 ml. of benzene. The resulting mixture was heated at reflux for 3 hours and distilled to give 21.2 g. (88% theoretical yield) of the substantially pure methyl 3-(diethoxyphosphinothioylthio)acrylate, B.P. 133–135° C./0.05 mm., and analyzing as follows:

|  | Found | Calcd. for $C_8H_{15}O_4PS_2$ |
|---|---|---|
| Percent C | 35.76 | 35.54 |
| Percent H | 5.69 | 5.59 |
| Percent P | 11.35 | 11.46 |

The above analyses, together with infra-red spectroscopy studies, thus confirm the following structure for the presently provided compound:

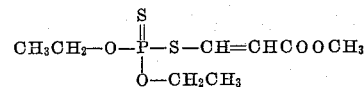

Infra-red spectrophotomer analysis showed the P=S group at 660 cm.$^{-1}$, the C—O group of the ester type at 1225 cm.$^{-1}$, and the P—O—CH$_2$CH$_3$ group at 1015 cm.$^{-1}$.

*Example 2*

This example describes an alternate procedure of preparing the methyl 3-(diethoxyphosphinothioylthio)acrylate of Example 1. Instead of using O,O-diethyl phosphorodithioic acid as in Example 1, there is employed the ammonium salt thereof, i.e., ammonium O,O-diethyl phosphorodithioate. Also, in order to determine the possibility of di-substitution, whereby two moles of the thiophosphorus compound would add to one mole of the propiolate to give a di-substituted propionate rather than the mono-substituted acrylate, there is shown in this example the use of two molar equivalents of the thiophosphorus compounds per molar equivalent of propiolate.

A mixture consisting of 40.7 g. (0.2 mole) of ammonium O,O - diethyl phosphorodithioate, 8.4 g. (0.1 mole) of methyl propiolate and 150 ml. of benzene was heated to reflux, at which point evolution of ammonia was noted. After refluxing for a total of 3.0 hours, during the last half of which no ammonia evolution was observed, there was added 2 ml. of 40% methanolic benzyltrimethylammonium methoxide. A renewed release of ammonia occurred. Refluxing was then continued for another 20 hours. Upon cooling to room temperature, the reaction mixture was filtered to remove the water-soluble solid (probably unreacted ammonium O,O-diethyl phosphorodithioate) which had separated out. The filtrate and benzene-washings of the solid were combined and distilled to give 19.7 g. of the substantially pure methyl 3 - (diethoxyphosphinothioylthio)acrylate, B.P. 121–125° C./0.1 mm. No evidence of a saturated 2:1 phosphorodithioate-propiolate addition product was obtained, the distillation residue comprising only 1.4 g. of a black, viscous tar.

*Example 3*

A solution of 12.6 g. (0.15 mole) of methyl propiolate in 50 ml. of benzene was added, dropwise, to a mixture consisting of 18.72 g. (0.1 mole) of ammonium O,O-diethyl phosphorothioate. The mixture was then refluxed for 2.5 hours. During the first 1.5 hours of reflux, evolution of ammonia was noted and refluxing was continued for an additional hour in order to assure complete reaction of the resulting O,O-diethyl phosphorothioic acid with the propiolate. After evaporating off the solvent from the resulting reaction, the residue was distilled to give the substantially pure methyl 3-(diethoxyphosphinylthio)acrylate, B.P. 121–124° C./0.1–0.05 mm., $n_D^{25}$ 1.4932, and analyzing as follows:

|  | Found | Calcd. for $C_5H_{15}O_5PS$ |
|---|---|---|
| Percent C | 37.80 | 37.79 |
| Percent H | 5.70 | 5.95 |
| Percent P | 11.95 | 12.18 |

Infra-red spectrophotometer analysis showed a P=O group at 1260 cm.$^{-1}$, a P—O—CH$_2$CH$_3$ group at 1010 cm.$^{-1}$, a C—O group of the ester type at 1220 cm.$^{-1}$ and a CH=CH group at 1600 cm.$^{-1}$. These data, together with the above elemental analysis confirm the following structure for the presently prepared compound:

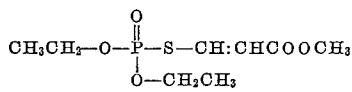

Example 4

Evaluation of the residual action of the methyl 3-(diethoxyphosphinothioylthio)acrylate of Example 1 against the southern armyworm, *Prodenia eridania*, was conducted as follows:

Uninfested Wood's prolific lima bean leaves are cut with petioles about 2 to 3 inches long. These were inserted in water-filled test tubes which were plugged with non-absorbent cotton and arranged on a holding block. An emulsion was prepared by placing 0.1 g. of the test compound into a flask, adding about 10 cc. of acetone thereto and 3 drops of an emulsifying agent known to the trade as "Tween 20" (polyalkylene glycol sorbitan monolaureate), and thoroughly mixing the whole. To the mixture there was then added 100 cc. of water to make an 0.1% emulsion of the test compound. The excised bean leaves were then dipped therein and placed on a holding block. "Controls" were prepared by dipping bean leaves into a similarly prepared emulsion which contained none of the test compound. When dried, the leaves were laid on absorbent paper and respectively infested with 10 third instar southern armyworm. The infested leaves were then stored in the insectary at 77° F. for 48 hours. At the end of that time, observation of the armyworm showed a 100% kill of those which had been placed on the leaves that had been dipped into said emulsion of methyl 3-(diethoxyphosphinothioylthio)acrylate whereas those which had been placed on the "controls" were alive and in excellent condition.

Example 5

Testing of the methyl 3-(diethoxyphosphinothioylthio)-acrylate of Example 1 against the red flour beetle, *Tribolium castaneum* (Hbst.), was conducted as follows:

A 1.0% solution of the test compound was prepared in acetone, and 1 ml. of said solution was respectively pipetted evenly over No. 2 Whatman, 9 cm. filter papers to give an applied deposit of 150 mg./ft.$^2$. "Controls" were also prepared by pipetting 1 ml. of acetone on each of two filter papers. The acetone was allowed to evaporate from all of the treated papers and the latter were then stored for 24 hours. At the end of that time, glass rings were set on each paper and 10 red flour beetle adults were placed within the rings. The tests were then held on the laboratory bench for 24 hours. Observation at that time showed 100% kill of all of the beetles that had been placed on the filter paper which had been treated with the acetone solution of the test compound at 150 mg./ft.$^2$, whereas in the case of the "controls," there was zero kill of the beetles.

Retesting of the present compound at decreasing concentrations showed that a 100% kill of the *Tribolium castaneum* was obtained from a deposit of 9.4 mg./ft.$^2$ of the methyl 3-(diethoxyphosphinothioylthio)acrylate.

Example 6

The methyl 3-(diethoxyphosphinylthio)acrylate of Example 3 was tested against the red flour beetle *Tribolium castaneum* using the procedure described in Example 5. A 100% kill of the beetles resulted from an application of 18.8 mg./ft.$^2$.

Example 7

This example describes testing of the methyl 3-(diethoxyphosphinothioylthio)acrylate of Example 1 and the methyl 3-(diethoxyphosphinylthio)acrylate of Example 3 against the yellow fever mosquito, *Aedes aegypti* (Linni). The following procedure was employed.

Culture tubes (rimless 25 x 200 mm.) were respectively filled with 70 cc. of distilled water. A 1.0% acetone solution of one of the test compounds was then respectively pipetted into the culture tubes in a quantity calculated to give a concentration of 10 p.p.m. of the test compound. Each tube was rubber-stoppered and shaken vigorously to facilitate complete mixing. "Controls" were also prepared by adding the same quantity of acetone (but no test compound) to tubes containing 70 cc. of distilled water, respectively. To each tube there was then added approximately 25 larvae of the test mosquito, and the test solutions with their contained larvae were allowed to stand for 24 hours at room temperature. Observation of the tubes of larvae at the end of that time showed a 100% kill of larvae in all of the tubes which contained either the methyl 3-(diethoxyphosphinothioylthio)acrylate or the methyl 3-(diethoxyphosphinylthio)acrylate and no kill of larvae in the "controls." Additional tests carried out in the same manner showed that 100% kill is obtained from 5 p.p.m. of methyl 3-(diethoxyphosphinothioylthio)acrylate and from 2.5 p.p.m. of methyl 3-(diethoxyphosphinylthio)acrylate.

The presently provided acrylate compounds are effective toxicants for the control of a wide variety of insects, and may suitably be used as agricultural chemicals for the control of insects on growing crops, generally. Only very low concentrations of the present compound is needed to produce insecticidal effect, e.g., from 0.0001% to 0.1% depending upon the severity of the infection and the insect species. At such concentrations, the present esters are not phytotoxic. For the convenient application of these low quantities, suitably the effective ingredient is applied in an inert carrier. Oil-in-water emulsions of the present compounds, obtained by preparing an emulsified concentrate thereof and then diluting with water, are highly suitable compositions for application to crops and have been found to possess unexpectedly superior insecticidal activity. By "oil" is meant any organic liquid which is immiscible with water. The present compounds may be also applied as dusts, i.e., in admixture with powdered or granulated inert carriers such as talc, pumice or bentonite.

What we claim is:

1. The method which comprises refluxing a mixture of an alkyl propiolate having from 1 to 8 carbon atoms in the alkyl radical and a salt of the formula

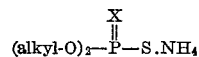

wherein X is selected from the class consisting of sulfur and oxygen and each alkyl contains from 1 to 8 carbon atoms, in the presence of an inert organic liquid diluent, and recovering from the resulting reaction product a compound of the formula

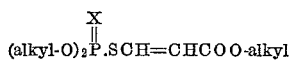

wherein alkyl has from 1 to 8 carbon atoms and X is as defined above.

2. The method which comprises refluxing a mixture of methyl propiolate and ammonium O,O-dialkyl phosphorothioate having from 1 to 8 carbon atoms in each alkyl radical, in the presence of an inert organic liquid diluent, and recovering from the resulting reaction product a compound of the formula

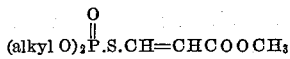

where alkyl has from 1 to 8 carbon atoms.

3. The method which comprises refluxing a mixture of methyl propiolate and ammonium O,O-dialkyl phosphorodithioate having from 1 to 8 carbon atoms in each alkyl group, in the presence of an inert organic liquid diluent and recovering from the resulting reaction product a compound of the formula

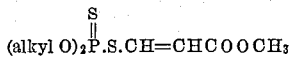

wherein alkyl has from 1 to 8 carbon atoms.

4. The method which comprises refluxing methyl propiolate with ammonium O,O-diethyl phosphorodithioate in the presence of an inert organic liquid diluent and recovering methyl 3-(diethoxyphosphinothioylthio)acrylate from the resulting reaction product.

5. The method which comprises refluxing methyl propiolate with ammonium O,O-diethyl phosphorothioate in the presence of an inert organic liquid diluent and recovering methyl 3-(diethoxyphosphinylthio)acrylate from the resulting reaction product.

References Cited in the file of this patent

UNITED STATES PATENTS

| | | |
|---|---|---|
| 2,579,434 | Kenaga | Dec. 18, 1951 |
| 2,611,729 | Bartlett | Sept. 23, 1952 |
| 2,685,552 | Stiles | Aug. 3, 1954 |
| 2,716,657 | Bretschneider | Aug. 30, 1955 |
| 2,722,539 | Anderson | Nov. 1, 1955 |
| 2,724,718 | Stiles | Nov. 22, 1955 |
| 2,807,637 | Slagh | Sept. 24, 1957 |
| 2,864,740 | Diveley | Dec. 16, 1958 |
| 2,894,014 | Stiles et al. | July 7, 1959 |
| 2,895,982 | Stiles | July 21, 1959 |
| 2,912,450 | McConnell | Nov. 10, 1959 |
| 2,956,073 | Whetstone et al. | Oct. 11, 1960 |

FOREIGN PATENTS

| | | |
|---|---|---|
| 167,432 | Austria | Jan. 10, 1951 |